United States Patent
Solis Agea et al.

(10) Patent No.: US 11,425,161 B2
(45) Date of Patent: Aug. 23, 2022

(54) COMPUTER-IMPLEMENTED METHOD, A SYSTEM AND A COMPUTER PROGRAM FOR IDENTIFYING MALICIOUS URI DATA ITEMS

(71) Applicant: LEAP IN VALUE S.L., Barcelona (ES)

(72) Inventors: Daniel Solis Agea, Barcelona (ES); Gerard Cervello Garcia, Barcelona (ES); Ramon Vicens Lillo, Barcelona (ES); Jordi Domingo Borras, Barcelona (ES)

(*) Notice: Subject to any disclaimer, the term of this patent is extended or adjusted under 35 U.S.C. 154(b) by 256 days.

(21) Appl. No.: 16/615,253

(22) PCT Filed: May 22, 2018

(86) PCT No.: PCT/EP2018/063412
§ 371 (c)(1),
(2) Date: Nov. 20, 2019

(87) PCT Pub. No.: WO2018/215485
PCT Pub. Date: Nov. 29, 2018

(65) Prior Publication Data
US 2020/0162484 A1 May 21, 2020

(30) Foreign Application Priority Data

May 22, 2017 (EP) ..................................... 17382291

(51) Int. Cl.
*H04L 9/40* (2022.01)
*G06N 20/00* (2019.01)
(Continued)

(52) U.S. Cl.
CPC ............ *H04L 63/145* (2013.01); *G06F 21/53* (2013.01); *G06F 21/566* (2013.01); *G06N 20/00* (2019.01);
(Continued)

(58) Field of Classification Search
None
See application file for complete search history.

(56) References Cited

U.S. PATENT DOCUMENTS 9,356,944 B1 * 5/2016 Aziz ..................... H04L 63/145
9,628,498 B1 * 4/2017 Aziz ................... H04L 63/1433
(Continued)

*Primary Examiner* — Christopher C Harris
(74) *Attorney, Agent, or Firm* — Eugenio J. Torres-Oyola; Victor M. Rodriguez-Reyes; Rafael Rodriguez-Muriel

(57) ABSTRACT

A computer-implemented method, a system and a computer program for identifying malicious URI data items are provided. The method a) gathers URI data items and b) analyses said URI data items to classify them into malicious URI data items and non-malicious URI data items. The method also c1) intercepts communications with malicious servers, identified by malicious URIs, from several computing entities, using sinkholing techniques, and uncovers and retrieves information which is being exfiltrated to said malicious or supervised servers, and c2) periodically monitors a status of the malicious servers identified by the malicious URIs, to control if they have been taken down or not, and simulates an infected bot to get updates of the commands sent from said malicious servers. The method also d) processes the uncovered information with learning algorithms, e) delivers to a mass storage device normalized and interpreted data; and f) provides warnings about potential cyber threats.

10 Claims, 8 Drawing Sheets

(51) Int. Cl.
*G06F 21/53* (2013.01)
*G06F 21/56* (2013.01)

(52) U.S. Cl.
CPC .... *H04L 63/1416* (2013.01); *G06F 2221/033* (2013.01)

(56) References Cited

U.S. PATENT DOCUMENTS

| | | | | |
|---|---|---|---|---|
| 9,912,681 | B1* | 3/2018 | Ismael | G06F 21/55 |
| 10,893,059 | B1* | 1/2021 | Aziz | G06F 21/566 |
| 2011/0145926 | A1* | 6/2011 | Dalcher | G06F 21/53 |
| | | | | 726/26 |
| 2013/0097706 | A1* | 4/2013 | Titonis | G06F 21/566 |
| | | | | 726/24 |
| 2013/0247192 | A1* | 9/2013 | Krasser | H04L 63/1425 |
| | | | | 726/23 |
| 2016/0328742 | A1* | 11/2016 | Shiravi Khozani | G06F 21/53 |
| 2018/0084002 | A1* | 3/2018 | Shnitzer | H04L 63/168 |

* cited by examiner

COMPUTER-IMPLEMENTED METHOD, A SYSTEM AND A COMPUTER PROGRAM FOR IDENTIFYING MALICIOUS URI DATA ITEMS

FIELD OF THE INVENTION

The present invention relates, in a first aspect, to a computer-implemented method for identifying malicious Uniform Resource Identifier (URI) data items, from both automatically gathered URI data items and candidate malicious binary files.

A second aspect of the invention relates to a system adapted to implement the method of the first aspect of the invention.

A third aspect of the invention concerns to a computer program adapted to implement the steps of the method of the first aspect of the invention

BACKGROUND OF THE INVENTION

Cybercrime involves theft of all kinds of information, in particular information with a high value, such as: passwords, logins, PIN codes, credit cards or banking credentials. This information is stolen by infecting users or server equipment with malware through browsing, sending spear phishing emails or in other ways.

There are several approaches in the state of the art designed to cope with cybercrime, mainly focused on malware detection.

One of said approaches is disclosed in U.S. Pat. No. 9,288,220, which proposes to use supervised machine learning techniques to detect malware in a computer network, where one or more machine learning models are applied to the features representing a probability score for malware to exist on a given device.

On the other hand, there are proposals focused on the detection and categorization of malicious URIs, particularly URLs, such as that disclosed by U.S. Pat. No. 8,521,667 which describes techniques for using features extracted from a URL to detect a malicious URL and categorize the malicious URL as one of a phishing URL, a spamming URL, a malware URL or a multi-type attack URL. The techniques employ one or more machine learning algorithms to train classification models using a set of training data which includes a known set of benign URLs and a known set of malicious URLs. The classification models are then employed to detect and/or categorize a malicious URL.

The results obtained by the known proposals are clearly improvable, both in terms of accuracy in the detections (avoid false positives) and also in terms of reducing the processing load needed to perform the detections.

The need for an additional security layer is obvious, in particular in cloud computing and virtualized environments, due to the availability of new obfuscation and evasion techniques.

It is, therefore, necessary to provide an alternative to the state of the art which covers the gaps found therein, by providing a method and a system for identifying malicious URI data items, which improves the ones known in the prior art

SUMMARY OF THE INVENTION

To that end, the present invention relates to a computer-implemented method for identifying malicious Uniform Resource Identifier (URI) data items, comprising:

a) automatically gathering URI data items; and
b) automatically analysing said URI data items to at least classify the URI data items into malicious URI data items and non-malicious URI data items, said step b) comprising the following sub-steps:
  b1) at least testing a plurality of candidate malicious binary files of said URI data items in a monitored sandboxing environment of a computing entity connected to a communications network, and, based on the behaviour of the candidate malicious binary files when being tested, classifying them into non-malicious binary files and different types of malicious binary files;
  b2) monitoring the network activity associated to said computing entity when said malicious binary files are being tested therein, to identify connections of the computing entity with one or more malicious servers, and obtain the URIs associated to said identified connections; and
  b3) analysing said URIs obtained at sub-step b2) and further URIs obtained directly from step a), to classify them at least into malicious and non-malicious URIs.

Said malicious servers are whether illegitimate servers (such as C&C, Exploit Kits, Phishing and Malware dropper URLs), owned by the cybercriminals or legitimate servers of companies hacked by cybercriminals in order to place malicious software in them.

In the present document, the terms URI data items, refer both to the URIs themselves (including URLs and URNs) and also to any element including or associated to a URIs, such as the above mentioned binary file.

For an embodiment, the method of the first aspect of the invention further comprises a step c) which at least includes the following sub-step:

c1) intercepting communications with malicious servers, identified by said malicious URIs, from several computing entities, by using sinkholing techniques, and uncovering and retrieving, through said intercepted communications, information which is being exfiltrated to said malicious or supervised servers.

The importance of sub-steps b2) and b3) is that, typically, a malware sample executed in a sandbox will generate many connections to different servers, but there is no way to know which connections are malicious and which are not (for example, a sample might connect to Google to check if the networking is functioning correctly). Therefore, not all connections can be assumed to be malicious, which is why is necessary to identify which connections are performed by the malware, which is the one that connects to the malicious servers, and then to classify or discard the rest of the connections. By the triage performed by sub-steps b2) and b3), the computing resources, including processing load, needed to implement the further steps are reduced, as only those URIs classified as malicious at b3) will be monitored: For example, only those communications identified by the malicious URIs will be intercepted at sub-step c1).

According to an implementation of said embodiment, step c) further includes the following sub-step:

c2) periodically monitoring the status of said malicious servers identified by the malicious URIs, to control if they have been taken down or not, and simulating an infected bot to get updates of the commands sent from said malicious servers to its network of bots, and vice versa.

The method of the first aspect of the present invention further comprises, for an embodiment, a step d) of processing said uncovered information with learning algorithms to normalize and interpret data contained therein, to identify sensitive data that has been stolen and information about where such data come from and associated information, to at least provide warnings about potential cyber threats or disconnect network communications of at least one computer.

Said normalized and interpreted data also includes, for another embodiment, a classification status for the URIS and/or malware (malicious, non-malicious, and unclassified) and also a change in that status, if that is the case.

For a further embodiment, the method of the first aspect of the invention further comprises a step e) of delivering to a mass storage device said normalized and interpreted data and also reports made at sub-step b1) containing information about the behaviour of at least the malicious binary files when being tested in said monitored sandboxing environment, and a step f) of providing said warnings about potential cyber threats and information included in said reports to a user, for example through a web interface.

According to some embodiments, said normalized and interpreted data is related to user's personal data, including at least one of passwords, logins, PIN codes, credit cards or banking credentials, and bots IPs, correlated with associated URIs and said reports made at step b1) and associated malicious binary files, the method comprising performing computer forensics to identify a Kill Chain relating a user's personal data with an associated malicious binary file, through corresponding bot IP, associated URI and binary execution report, i.e. to reconstruct such a kill chain or attack steps from the source or distribution to the end-user which is finally affected by the personal information theft.

None of the methods of the prior art is able to identify the above mentioned Kill Chain, i.e. the whole structure of an attack, or attack steps, from the source or distribution to the end-user, and provide feasible means to help to stop the attack.

The concept of Kill Chain, in the field of information security, refers to a model to describe and represent the full lifecycle of a cyber-attack. It is broadly used amongst the cyber-security community to help identify and prevent intrusions, especially when conducted by APTs (Advanced Persistent Threats) and with a predominant malware-prevention focus.

This model describes an intrusion as with the following sequential phases: Reconnaissance, conducted to harvest the maximum information (names, email addresses, credentials, infrastructure resources . . . ) of the target to enable or potentiate following phases; Weaponization, in which the adversary builds its attack infrastructure and prepares a deliverable payload taking advantage of an exploit or backdoor; Delivery, consisting on sending the weaponized bundle to the target, by means of a malicious link in a legitimate-looking email, for example; Exploitation, in which a vulnerability on the victim's system is exploited to execute code predefined by the attacker; Installation, during which malware is installed on targeted assets of the victim; Command and control, where the attacker creates a channel to control the infected systems remotely; Actions, in this last phase the adversary conducts its intended goals over the victim and its assets.

This concept is adapted from the military usage where it is used to describe the end-to-end phases of an attack. It is described as a chain because an interruption of any of the phases is a potential interruption of the entire attack. Same characteristics apply on the computer security model, as the closer to the initial point of the Kill Chain an attack can be halted, the less information and resources it will have acquired and less probable will be for the attack to continue.

Breaking down attacks to this phases will provide great means to stop attacks, as during the early stages of the Kill Chain is when they are most vulnerable. Successfully identifying malicious URLs used by adversaries during the weaponization or delivery phases in a large-scale basis, as explained in step b, could potentially disrupt the next stages of the attack and prevent them from happening at all.

The invention, as described in step c1, has the potential of halting even attacks that have reached the last phase and are already taking advantage of the victim, as disrupting the communication channel of the attacker disables further actions that could be conducted on its systems.

The above mentioned sub-step b2) also comprises, for an embodiment, obtaining additional information, including metadata, associated to at least the obtained URIs, and process said additional information at sub-step b3).

The method of the first aspect of the present invention comprising, for an embodiment, performing at least the above mentioned sub-step c1) by using said additional information, processed or unprocessed at sub-step b3), when associated to said malicious URIs, to perform said communications interception and information uncovering and retrieving.

Said additional information includes, for several embodiments, at least one of the following types of information, which are given in a non-exhaustive manner: encryption keys, configuration parameters, types of servers, HTML content, and JavaScript code.

For an embodiment, the method of the first aspect of the invention comprises performing sub-step b3) to automatically extract features from URIs, HTML and JavaScript content.

For an implementation of said embodiment, sub-step b3) is performed by using a combination of signature based algorithm and machine learning techniques implemented, for example, by means of at least one or more convolutional neural networks.

Alternative implementations for performing sub-step b3) are also envisaged by the method of the first aspect of the invention, such as having only a signature based system which does not scale-up when dealing with large volumes of URIs to be processed, making the classification system hard to maintain.

The method of the first aspect of the invention comprises implementing said machine learning techniques, for an embodiment, by means of a trained network which combines several of said convolutional neural networks, each trained with data from a different source, wherein each of said convolutional neural networks includes one logical layer on top of word vectors obtained using an unsupervised neural language model, and one logical output layer which outputs the probability that each analysed URI belongs to a malicious URI.

For an embodiment, the method of the first aspect of the present invention comprises performing the above mentioned sub-step c1) by means of receiving requests (such as JSON, STIX or TAXII REST requests) including at least the following information: URI, type of servers and said additional information; and in response to said requests and using the contents thereof performing said communications interception by managing DNS pointers and IP traffic mirroring, and wherein the sub-step c1) further comprises, in response to said requests, selecting and running the most appropriate algorithm for each URI, based at least on the type of server associated thereto, out of a plurality of available algorithms, said running causing said uncovering and retrieving of exfiltrated information.

The present invention also relates, in a second aspect, to a system for identifying malicious Uniform Resource Locator (URI) data items, the system comprising one or more computing entities adapted to perform the steps of the method of the first aspect of the invention, said one or more computing entities including at least the following modules operatively connected to each other a raw information gathering module adapted to perform step a); and a classification module adapted to perform step b).

For an embodiment of the system of the second aspect of the present invention, said one or more computing entities further include the following functional modules to perform the above described embodiments of the method of the first aspect of the invention including steps e) and f):

an information and extraction module operatively connected to said classification module to receive said malicious URIs and associated additional information provided by the classification module, wherein said information and extraction module is adapted to perform step c) and to provide the uncovered information to a data processing module connected thereto;

the above mentioned data processing module operatively connected to the information and extraction module to receive the uncovered information and adapted to perform step d) and the action of providing the normalized and interpreted data and also reports of step e) to a mass storage device connected thereto;

the above mentioned mass storage module adapted to implement the mass storage device in step e); and an interface module (for example, a web interface module) operatively connected to the classification module, the information and extraction module, the data processing module, and the mass storage module, wherein said web interface module is adapted to perform step f) and also the control of the operation and management of the modules connected thereto.

A third aspect of the present invention relates to a computer program, comprising computer program components including code instructions that when executed on one or more processors implement the steps of the method of the first aspect of the invention.

By means of the present invention, a new automated technology is developed which helps companies prevent and detect data exfiltration produced by malware infections, by automating a procedure based on information gathering, classification, information extraction & monitoring of all related threats that are in the wild, like malware distribution using Exploit Kits and emails, data exfiltration to C&C or spear phishing attacks.

By means of the present invention, illegitimate servers owned by the cybercriminals or legitimate servers of companies (hacked by cybercriminals in order to place malicious software in them) that operate server farms (physical or virtual) are monitored and tracked to enable automatic detection and extraction of information stolen by cybercriminals in order to inform the competent authorities and the legitimate owners thereof. This recovery will take place, for some embodiments, by applying sinkholing and monitoring (bot simulation) techniques to malware/virus/trojans (i.e. malicious binary files) and by processing a large volume of heterogeneous data using mass storage, such as those based on Big Data technologies.

BRIEF DESCRIPTION OF THE FIGURES

In the following some preferred embodiments of the invention will be described with reference to the enclosed figures. They are provided only for illustration purposes without however limiting the scope of the invention.

DESCRIPTION OF THE PREFERRED EMBODIMENTS

Figure 1:
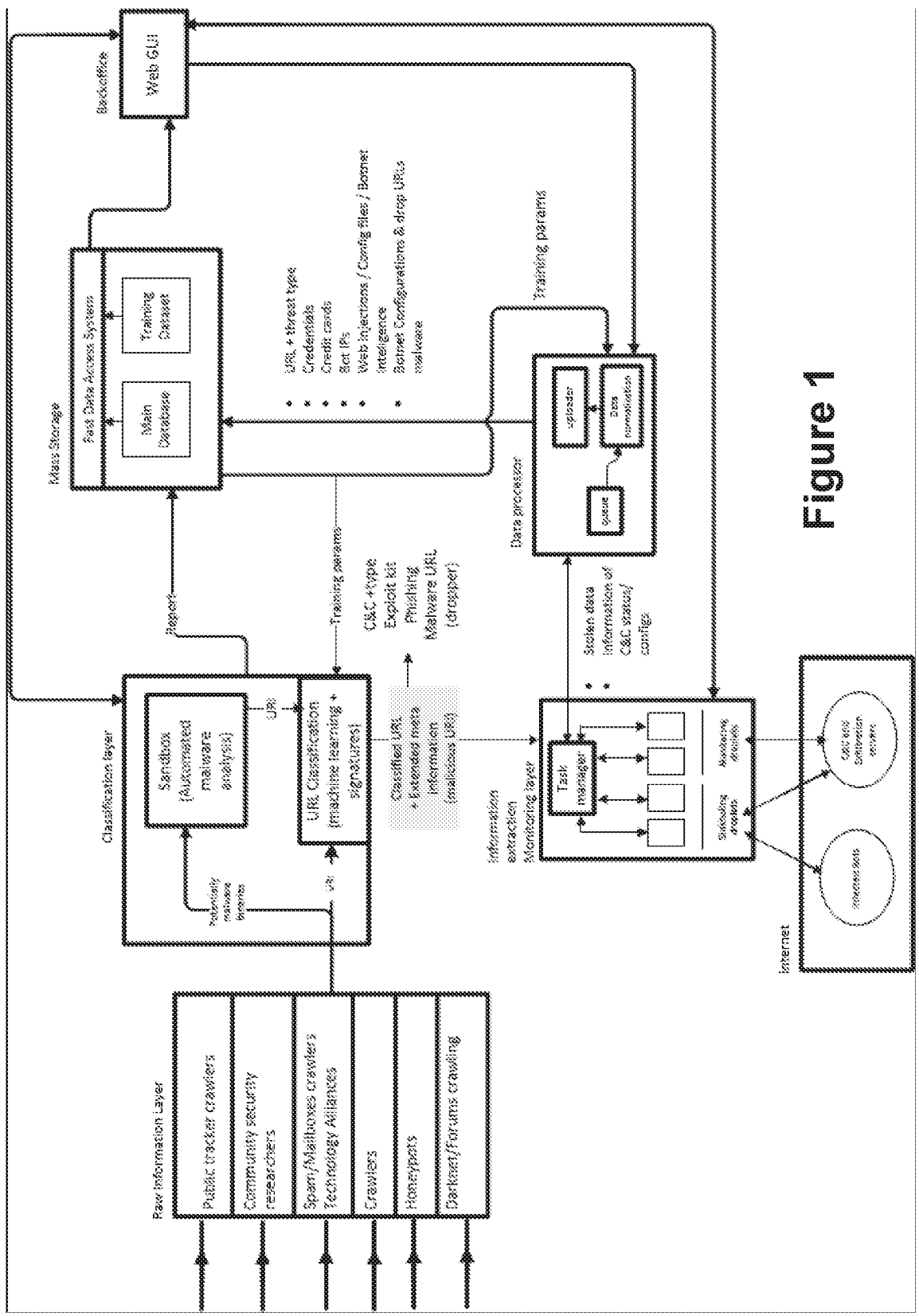
FIG. 1 schematically shows a global overview of the layers and flow diagram of the botnet information uncovering process carried out according to an embodiment of the method of the present invention.
Figure 2:
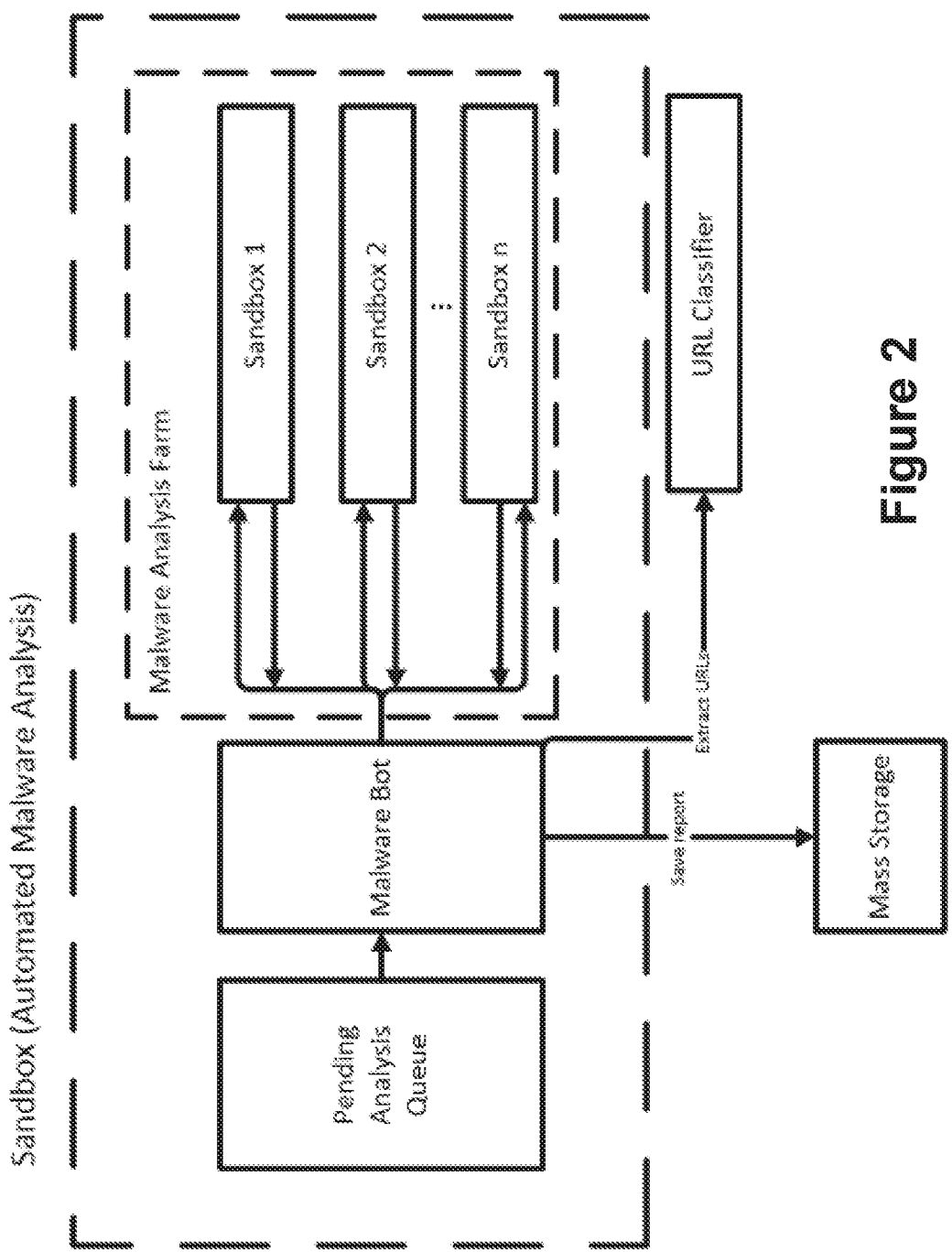
FIG. 2 is diagram showing sandbox scalability and controller (malware Bot) for implementing part of the method of the first aspect of the invention, including sub-steps b1) and b2), for an embodiment.

The present inventors have used the present invention to implement two product outcomes, named "BTIP Platform" and "threat Intelligence Feed".

BTIP platform implements the present invention, by means of botnets, with the purpose, among others, of recovering exfiltrated data, such as stolen credit card information, and obtaining the above mentioned reports about malicious binary files (mainly targeted malware), and is set up by using different inputs, such as domains, IPs, keywords and bincodes.

Threat Intelligence Feed provides information obtained by means of the present invention, regarding Crimeservers URLs (C&C, Exploit Kits, Phishing, Malware URL (dropping URLs)), Bot IPs, and Malware Hashes, to clients, in order to implement different actions based on said information, such as disconnecting communications, when the client integrates said information in a Proxy, or provide real-time analysis of security alerts when the client integrates said information in a SIEM (Security Information and Event Management).

The following technological components are affected by the present invention:
  Information gathering crawlers
  Malware sandbox service
  URL classification service
  Sinkholing service
  Monitoring service
  Botnet Parser service
  Backend storage infrastructure
  Backoffice web interface In the present section, a generic description (in the form of a layered approach) of the process/method and system of the present invention will be made, particularly for a subset of URIs, namely URLs, supported on FIGS. 1 to 6, and also description of more specific examples with reference to FIGS. 7 and 8.

Generic Description

Goal:

The aim of the method present invention is to create a platform based on new algorithms that allows getting, classifying, processing and uncovering stolen information from a huge amount of URLs (botnets) a day.

The uncovered information is extracted by applying sinkholing or monitoring techniques of malware/virus/Trojans, and the extracted information (heterogeneous Big Data) will be industrially processed using Big Data and machine learning techniques.

The ability to check whether the clients' data have been compromised is an element with huge added value. Within the Research and Development projects, the following most representative uses of the solution proposed have been identified:
  For clients owning servers (companies, hosting service providers): to detect the fraudulent use of legal servers hosting data (credit cards, banking credentials, etc.) and/or applications of cybercriminal organizations.
  Informing the financial institutions issuing the cards or credentials that have been stolen and whose users and customers are vulnerable, leading to cost savings both for replacing the cards involved and for the fraudulent use of these cards.
  Offering premium services to companies interested in making their information compilation processes automatic.
  Shorten the time of the incident response and minimize the window of exposure by providing early detection mechanisms and capabilities for protecting their systems against multiple cyber threats.
  Identify potential intrusions and infections in an organization network, potentially helping to mitigate the damage before the incident response team take action.

Process Description: Logical Layers:

Infrastructure main functionalities and logical layers:
  Raw information gathering layer: This automatically gathers malware samples or URLs to be analyzed in further layers such as the Classification layer or information extraction & monitoring. The system of the present invention also has automated crawlers and multiple spam mailboxes and honeypots that are able to obtain public information, and mechanisms to retrieve information from different sources.
  Classification layer: This layer is responsible for the classification of the raw information provided by the information gathering layer. This layer is extremely critical and difficult to scale-up. For this reason, the usage of Machine Learning algorithms has been adopted in order to help the engine identify more malicious patterns that are in the wild, even if the present inventors have never seen them before. The classification is done at two different levels:
    Binary Classification: Every malware sample or binary is run inside a malware analysis sandbox, which provides an extensive and detailed report about what the sample does in a machine, providing information about created/read files, interactions with the operating system items, network communications (IPs and URLs), and extended properties of the malware, like Domain Generation Algorithms, Encryption keys and configuration files used by the malware, etc.
    Each malware sample is classified based on static or dynamic behaviour patterns that are processed using the analysis report. After that, the sandbox develops a post-processing report from where C&C (Command and Control server) URLs are automatically extracted.
    URL Classification: URLs collected by gathering layer and URLs collected by the Binary Classification engine (malware sandbox).
    The existing problem is that for most URLs, the engine only obtains the URL itself, without any kind of metadata or additional information, and so, it must be classified in order to be used. This being the objective of the classification layer, which classifies all of the known crime servers (C&C, Exploit Kits, Phishing and Malware dropper URLs).
    Typically, a malware sample executed in a sandbox will generate many connections to different servers, but there is no way to know which connections are malicious and which are not (for example, a sample might connect to Google to check if the networking is functioning correctly). Therefore, not all connections can be assumed to be malicious, which is why is necessary to identify which connections are performed by the malware, which is the one that connects to the C&C, and then to classify or discard the rest of the connections.
    This classification layer is also intended to use public or private sources, provided by information gathering layer, in order to obtain malicious URLs and classify them, therefore the general aim of this layer is to decide which of the incoming URLs are malicious and hence process them in the information extraction & monitoring layer. Without this triage, too many URLs (both malicious and not) would need to be monitored, requiring too many resources.
  Information extraction & monitoring layer: This layer uncovers the information that is exfiltrated from the infected bots to the C&C. This layer is based on sinkholing techniques, allowing the system to intercept communications between the infected machines and the bad guys.
    On the other hand, this layer is also able to perform a periodic monitoring of the status of the C&C, and control if it has been taken down or not, and get updates of the commands sent from it to its network of bots, by simulating that is an infected bot.
    It is important to notice that the obtained information is in a raw format which depends entirely on the imagination of the developer who created the malicious software.

Data processing: Once the data has been gathered, it is sent to the data processing layer, which is responsible for normalizing the data and for sending them to the Big Data engine. In order to do that correctly, some complex algorithms based on learning capabilities must be placed to solve the wide variety of information formats that we can uncover from the information extraction layer.

Mass Storage: It is basically a large-volume data storage or "Big Data" system, which has a huge storage capacity, which, combined with fast data access, supports the feeding of the APIs/Platform interface to deliver the information to customers of the system of the present invention.

Backoffice Web GUI: It is a web interface to control the performance and management of the whole infrastructure, including data visualization and comparison about Botnets and information sources, and building (by reporting false positives) the training dataset for different machine learning algorithm.

Infrastructure Technical Details:

As stated above, in order to identify malicious activity or cybercrime servers (hereinafter referred to as crime servers), the architecture depicted in FIG. 1 has been proposed, for an embodiment of both the method and the system of the present invention.

Each layer has an important role in order to achieve the whole automation process, from analysing a single malware piece, up to recovering the stolen information:

Raw Information Gathering:

This layer gathers malware samples or URLs to be analyzed in further layers such as the Classification layer or information extraction & monitoring layer. The system of the present invention also has automatic crawlers and multiple spam mailboxes and honeypots that are able to obtain public information, and mechanisms to retrieve information shared by our technology partners.

This present invention provides a set of malicious URLs from various sources for gathering information about malware, botnets, C&C, exploit kits, phishing, and backdoors published in public and private databases.

Classification Layer:

This layer is responsible for the classification of the raw information provided by the raw information gathering layer. This layer is extremely critical and difficult to scale-up. For this reason, the usage of Machine Learning algorithms has been adopted in order to help the engine identify more malicious patterns that are in the wild, even if the present inventors have never seen them before. The classification is done at two different levels:

Binary Classification: Binaries (Executable files and Documents) are run inside a malware analysis sandbox which is fully monitored, being able to get details of what the sample does in the system. In order to scale-up the architecture, it has been designed with the subsystems depicted in FIG. 2, that are able to process many malware reports independently. The depicted malware bot manages the submission and report retrieval for each sample (i.e. for each binary file), following the order of the depicted pending analysis queue, makes sure that the sample has been processed correctly in the corresponding sandbox (i.e. from Sandbox 1, 2 . . . n), and saves the reports into a mass storage device. In addition, it extracts C&C URLs and meta-information to be provided to the URL classification engine (URL classifier).

URL Classification: In order to scale-up the classification service, from the architecture point of view, it has been designed as depicted in FIG. 3.

Figure 3:
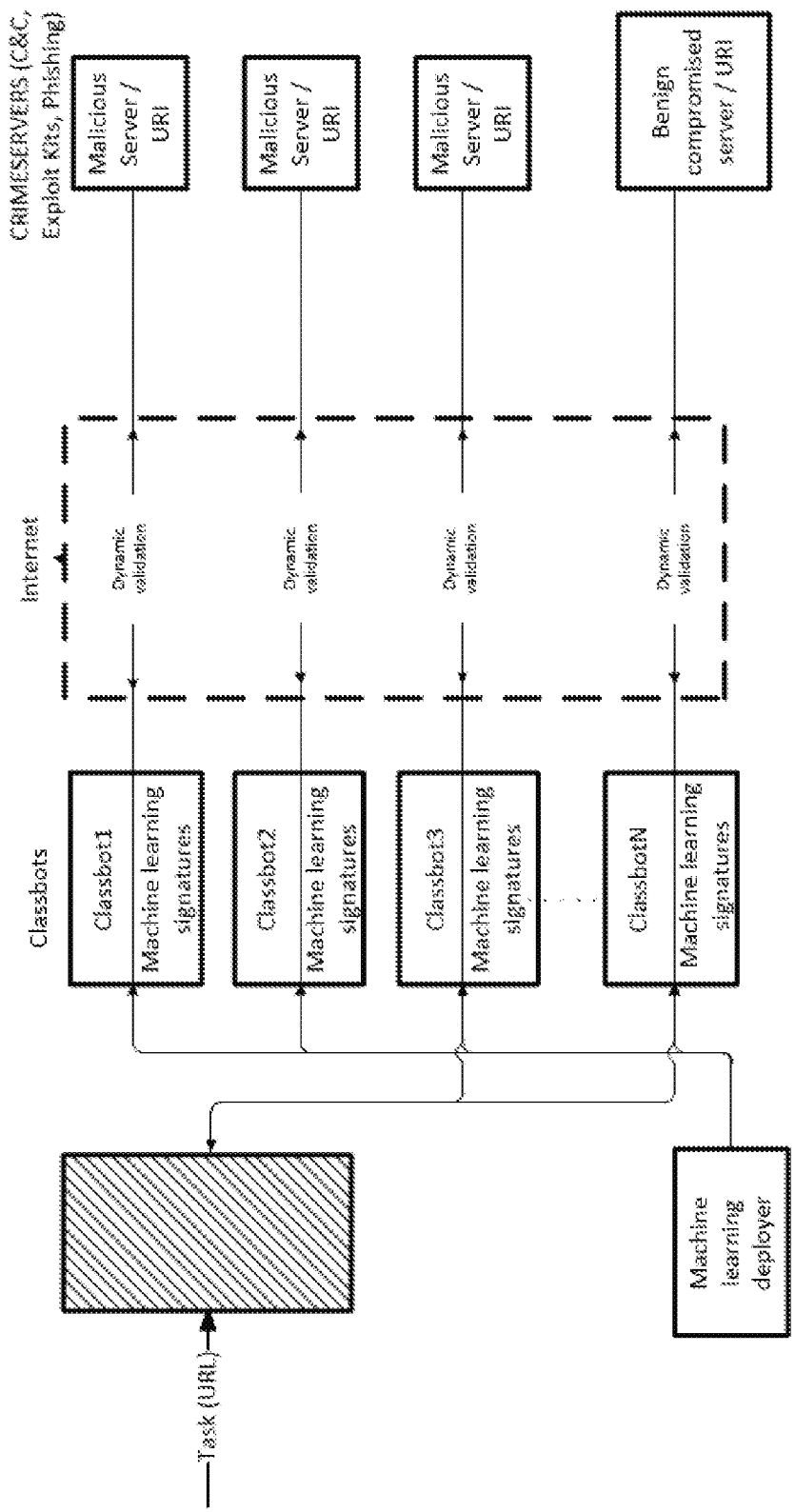
FIG. 3 schematically shows a distributed and scalable URL classification service infrastructure for implementing an URL classification (signatures+Cerberus Machine learning) according to the method of the first aspect of the invention, for an embodiment.

The diagram of FIG. 3 shows how the classification infrastructure has been prepared to scale-up by using a Celery Queue at Amazon SQS service. The queue will handle each URL status and data, whereas the classification bots (Classbot1, . . . ClassbotN) will pull and push the result of the classification into this queue.

The advanced algorithms, based on machine learning techniques, are placed automatically, once the training parameters have been calculated, into each classification bot. This algorithm is named internally by the present inventors as Cerberus and has the following components:

Convolutional Neural Networks (CNN), which are used to extract features automatically from URLs, HTML and JavaScript content. The words/tokens that are used to feed the convolutional network are extracted from three sources:
URLs
HTML belonging to the URLs
JavaScript code (mainly used to identify malicious behaviour at JavaScript level, commonly on Exploit Kits)

Trained Network: The trained network is a combination of simple CNNs with one layer on top of word vectors obtained using Word2Vec, an unsupervised neural language model, each one trained with data from a different source, i.e. one CNN is trained with the characters composing an URL, the next CNN is trained with the tags extracted from the HTML content and the last CNN is trained using the content of the JavaScript code.

Each individual CNN is composed by 5 layers:
Input layer: It is composed by the "words/tokens" that are used to feed the network. These "words" depend on the input source.
URL string: The "words" are the characters that compose the URL.
HTML content: The "words" are the tags of the HTML content.
JavaScript code: The "words" are extracted from the JavaScript code.
Embedding layer: It is responsible for mapping the words in the vocabulary into a low dimensional vector representation.
Convolutional layer: It automatically extracts features/patterns from the input data.
Max-pooling layer: It selects the maximal discriminant patterns extracted in the convolutional layer.
Output layer: It outputs the probability that an URL belongs to each type based on the patterns extracted by the previous layers.

Word2Vec is a neural language probabilistic model proposed by Mikolov, used for learning word embedding's. In particular, the embedding's were generated using the Skip-Gram approach.
The Skip-Gram approach tries to predict the words surrounding a target word. If the network is used to predict one word to the left and one word to the right, it will output a two-dimensional vector, with one dimension of the vector containing the probabilities of the words in the vocabulary to appear at the left of the target word and the other dimension containing the probabilities of the words in the vocabulary to appear at the right of the target word.

The word embedding's generated are used to initialized the weights of the neurons in the embedding layer of each convolutional network before training.

Figure 4:
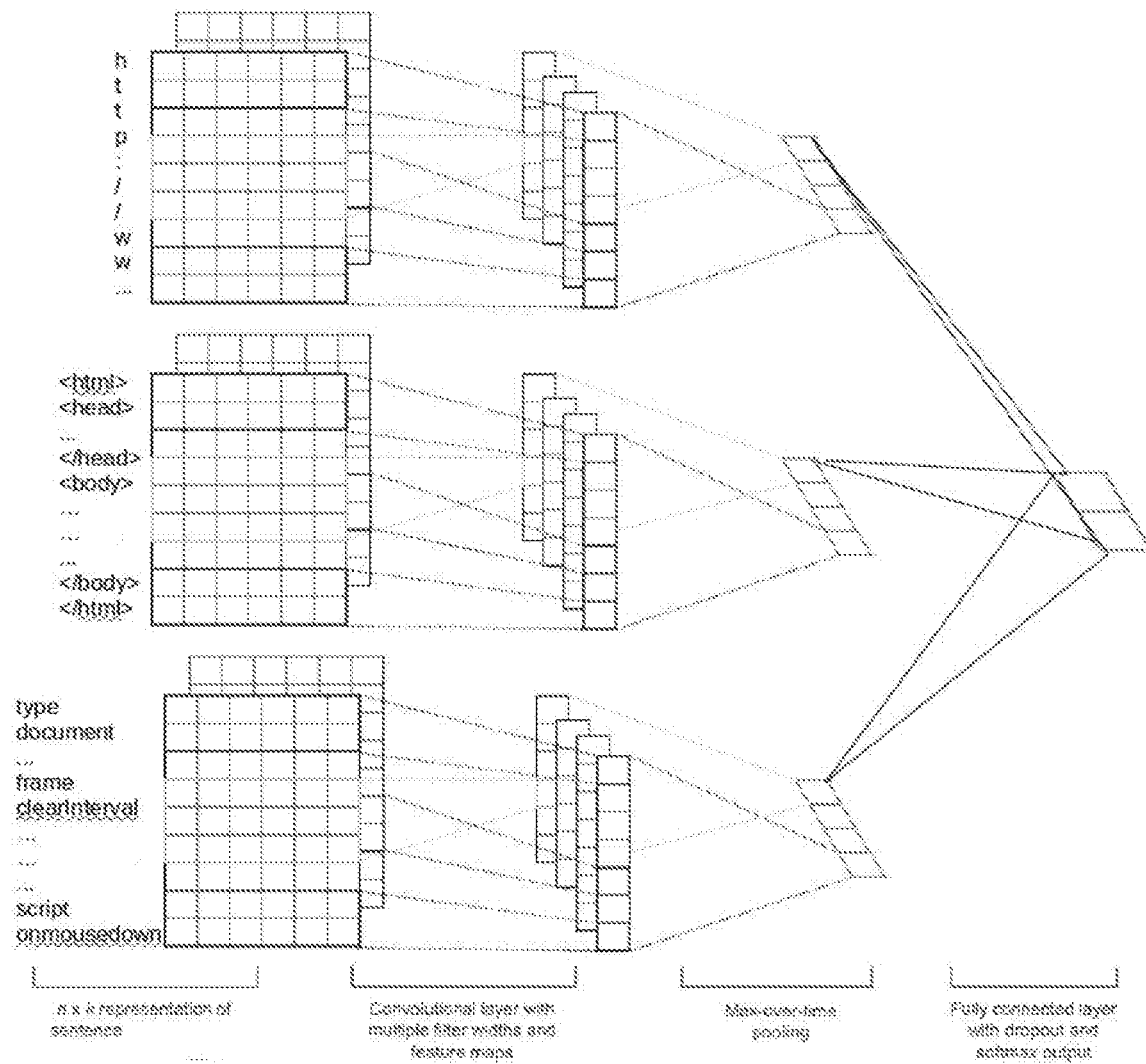
FIG. 4 shows a design of a convolutional neural network used for performing sub-step b3) of the method of the first aspect of the present invention, for an embodiment.

FIG. 4 shows an example of the architecture of the learning algorithm, showing the overall structure of the convolutional neural network, which input is a combination of URL, HTML code and Javascript code, generating an output of a probability of Benign, C&C, Phishing or Exploit-kit URL.

Figure 5:
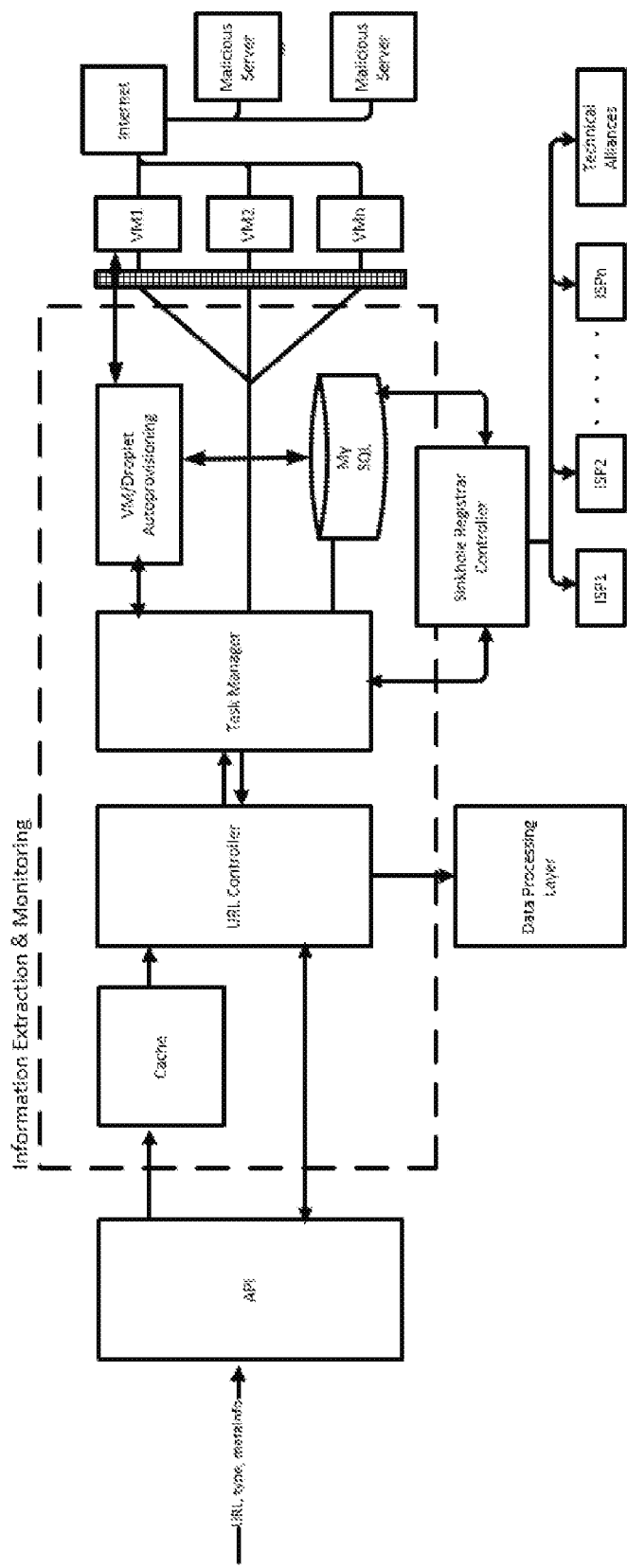
FIG. 5 is a diagram of the services working on the Information & Monitoring layer or module of the system of the second aspect of the invention, for an embodiment, to perform step c) of the method of the first aspect.

Information Extraction & Monitoring Layer:

This layer can be summarized as depicted in FIG. 5, and its components are described below.

Input API:

It receives JSON REST requests with the following information:
- URL
- The crimeserver type: ZEUS, CITADEL, etc.
- Additional information: the malware's encryption key, its configuration, etc., and the result of the intelligent malware analysis.

All received URLs are stored in a non-volatile disk-based cache which is processed in order to discard duplicates and to handle URLs in the short-term.

After the cache is validated, the new URL is entered into the sinkholing and monitoring system as a new task in the task planning system (Task manager).

URL Controller

As part of the core system, a small module for validating results has been implemented. This service is basically aimed at monitoring all URLs entered into the task planner In order to control the results obtained by executing the plugins. These results will be stored on the Mass Storage system by means of another micro-service dedicated to normalising and uploading data, the Data Processor.

Task Manager

This is primarily an engine for executing plugins and modules, with the following characteristics:
- Based on the kind of crimeserver, identifying the plugin or plugins to be executed, even being able to execute multiple modules for the same URL.
- The relation between URL and modules being executed is 1 to N, so that N modules can be concurrently executed on different machines.
- Through the sinkholing controller, manage the modification of the DNS pointer or IP traffic mirroring.
- Through the auto-provisioning layer, managing the creation of different droplets or virtual machines that would allow the plugins or modules to be executed. Requesting, when demanded, a free auto-provisioned machine that can be used to execute the plugin.
- Loading the plugin or module in the remote machine with the credentials provided by the auto-provisioning layer.
- Scheduled execution of modules. This enables all modules or plugins require regular execution to be monitored.
- It will include a pre-processing, a processing/execution of the plugin per se and a post-processing logic, in other words, the actions to be taken once the execution of the plugin has been completed.
- The results from the tasks launched by the Task Manager are stored in a relational database based on MySQL (or on other type of relational database), in this way all the results can be delivered to URL Controller. This database must include information about the plugins, with information about the plugin type, identifier, description and execution requirements for the plugin, etc.

Information about the execution status of the virtual machines/droplets will also be stored, such as the status of the machine, errors, programs being executed, recent activity, workload, etc. It should be pointed out that this database is intermediary, which is a requirement for the temporary management of the task.

Sinkholing Controller:

It is responsible for the management of the DNS pointers and IP traffic mirroring that would allow the bot traffic interception, and to detect and extract all the stolen information that the malware tries to send to the C&C server.

It is a manager that understands how to communicate to each technical collaborator such DNS Registrars, IPSs or Hosting Providers in order to achieve the interception of the communication within the bot and its C&C/Exfiltration server.

VM/Droplet Auto-Provisioning:

This is the layer for auto-provisioning virtual machines or droplets that will be used to launch the plugins, which will enable obtaining information that is stolen by malware.

This system will manage creation, deletion, installation, and updating of all virtual machines to be used in the system, listing the following features:
- Automatically and fully dynamically creating and deleting virtual machines depending on the needs for consumption and allowing all connections to be rerouted towards the sites to be monitored
- Managing and monitoring each and all of the active virtual machines and identifying any downtimes and errors occurring in these machines
- Using a virtual machine template, which will deploy identical virtual machines with the same features.
- A set or pool of available (dynamic) machines can be defined for use, the system will therefore be at its optimum level, because creating and deleting a machine can be avoided every time a plugin must be launched for a certain IP or URL.

Data Processing Layer:

This layer constitutes an intermediary system with the following features:
- Reception of processed tasks and normalisation of data
- Uploading data to the Mass Storage system through its relevant API
- Temporary storage of the results and status of data uploading
- Providing results of the data upload to the back-office system so that it can store the status in its database.
- It works with data of different kinds provided by the information extraction plugins, and it normalises them so that they can be suitably interpreted in order to identify sensitive data that have been stolen, information about where such data come from and intelligence related, such as IPs, malware campaigns, etc.

Figure 6:
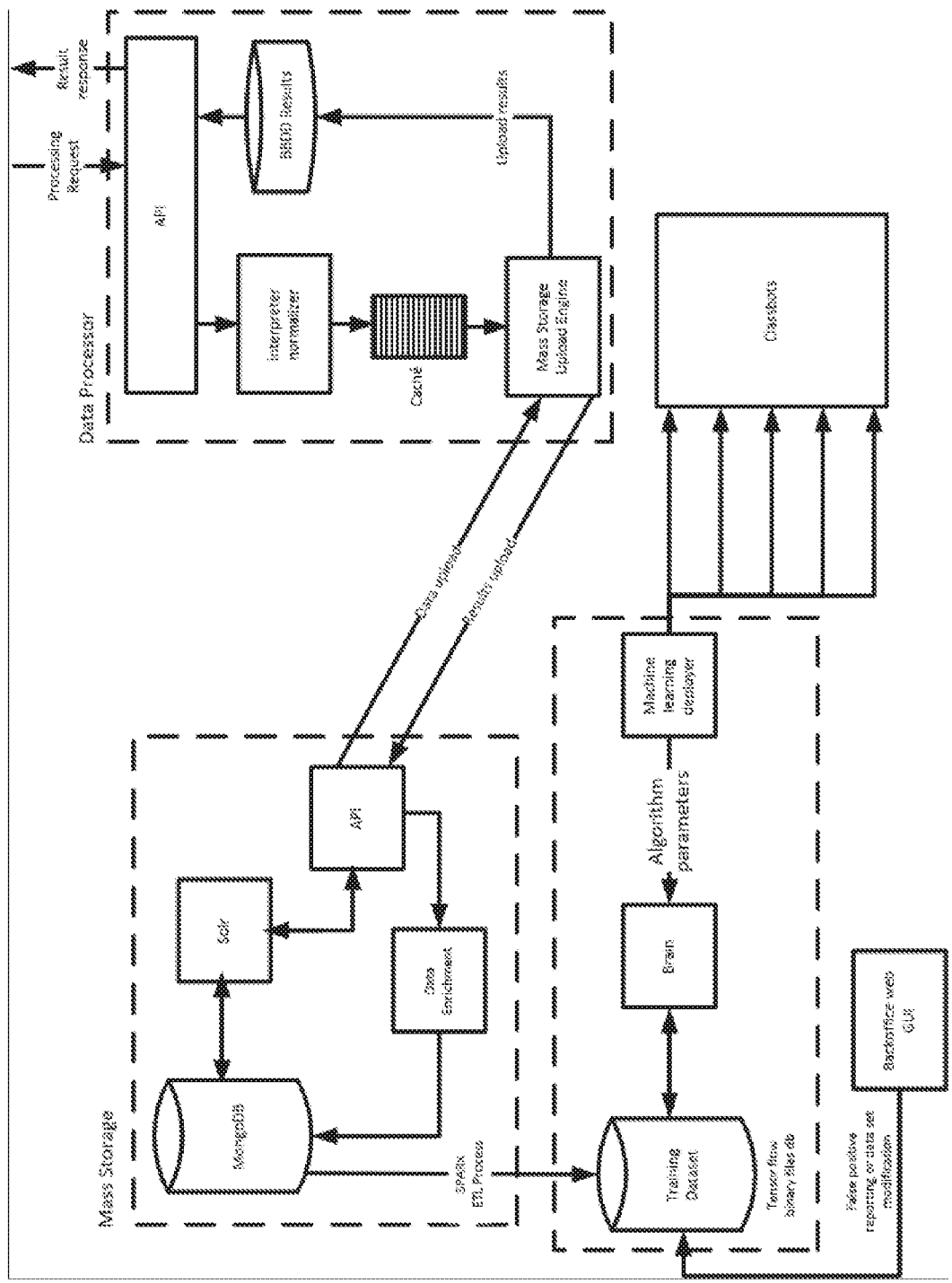
FIG. 6 is a diagram of services working on the botnet data processing and storage at Mass Storage implementing the data processing and storage modules adapted to perform steps d) and e) of the method of the first aspect of the present invention, for an embodiment. In addition, it can be seen the interaction of the storage of URI data items to build, train and deploy the machine learning algorithm to the classification layer.

As shown in the diagram shown in FIG. 6, this intermediary system consists of the following:
- API: This is used for integration with other servers, e.g. URL Controller, which mainly allows to receive new data processing tasks and to query the results obtained after the data are uploaded to the Mass Storage system
- Data Normaliser and Interpreter: This is used for obtaining any kind of data from all the raw contents provided by the information extraction plugins. This intelligent system can identify information related to credit cards and banking credentials that have been stolen and illegitimately hosted on the servers of clients who have contracted the service Intermediary caching system: Since for each kind of data that could be received there is a large number of duplicate results, an intermediate cache for discarding duplicates has been created, hence optimising the volume of data being uploaded to the Mass Storage Data upload engine: This is the client of the Mass Storage API, which is mainly responsible for uploading all the pre-processed data to the mass storage system according to the data upload endpoint specifications Intermediary database: This will mainly be used to temporarily store the results obtained from each data upload that the API will send to other systems such as URL Controller Regarding the normalisation and interpretation of data, an algorithm has been designed that can identify credentials and credit cards provided in raw data. This includes the following, as examples:

Raw data of HTTP/s requests captured from the malware communicating with the C&C, resulting in the problem of identifying the credential and credit card sent to the C&C and taking into account which service does that credential belongs Formatted data obtained in CSV Not normalised or encrypted data Information divided into various different files, each of them containing relevant information for processing them as a whole Others depending on the storage technology used by the cybercriminals In order to deal with the complexity of processing data in multiple formats, this data normalising and interpreting system includes the processes listed below:

Identifying the kind of file to be interpreted by partially reading it

If the file is in an unknown format, various heuristics are applied in order to extract as much information as possible. The file is scanned for patterns such as the following:

Use of separators

Raw HTTP/S requests

Credit card numbers

Email addresses

Reading the pre-processed data line-by-line

The following is applied to each line:

A blacklist filter for crimeserver URLs that have been reported as being false positives One or more data processing functions, including decrypting and converting date formats One or more heuristics for extracting relevant data, e.g. IP addresses, credit card numbers and expiry dates or credentials If there are one or more raw HTTP/S requests, heuristics will be applied to extract relevant data entered into HTML forms, including usernames or passwords, by using intelligent algorithms Each extracted piece of evidence or IP will be compared with the ones uploaded and stored in the cache, in order to optimise the process for uploading data to the Mass Storage. The extracted and unduplicated data is uploaded to the Mass Storage service so that they can be indexed and queried by an API.

Mass Storage Layer (Backend Storage):

This is an intermediary large-volume data storage or "Big Data" system, which has a huge storage capacity with the following features:

Design and implementation of an information search and analysis engine based on SOLR Design and implementation of a REST API to allow queries of the available information, using "Deep Paging" technologies for fast access to large volumes of information Design and implementation of a set of REST API points for obtaining statistical data Adaptation of the schema defined in SOLR to provide calculation capacities for the required statistics Creation of a strategy for automatically importing data from MongoDB to SOLR, without perceivably diminishing performance of the searches The data processing and storage layer has been divided into the following separate internal services from an architecture standpoint:

Data Processor: This is used for receiving data processing tasks in order to normalise and upload them in non-structured form to the "Big Data" storage system Mass Storage: This is used for receiving large volumes of data to store and index them so that they can be quickly accessed The architecture diagram for the integration between both services is shown in FIG. 6, and described below.

As can be seen from the diagram shown in FIG. 6, the Mass Storage Layer constitutes a system for storing a large volume of data that consists of the following:

API: Allows the integration with other services for storing data (upload) or for performing queries. It mainly interacts with the Data Processor system and the main Product Customer interface (MRTI Feed and CTIP)

Database for large non-normalised data: This uses the MongoDB database (or other type of non-relational database) for storing non-normalised data. Various data collections have been identified and designed so that all the required information can be stored. Some of the data initially considered are the following: origin/crimeserver of the information, type of information, credentials, IPs, domains, IP/domain metadata information, date monitoring, information about the infected bot, etc.

Indexing engine: The SOLR indexing engine (or other type of indexer engine) regularly synchronises the information stored in the database so that it can be quickly accessed through the API Data enrichment service: This micro-service is part of the Mass Storage system and its main aim is to identify information related to IPs, domains and URLs and to perform monitoring/updating of the metadata related to geolocation, registries/owners, ASNs, etc.

ETL process: It refers to the data warehouse process that performs:

Data extraction: Extracts data from a data source (Distributed File System)

Data transformation: Transforms the data to the desired format. This phase is performed using a fast distributed processing framework Data loading: Loads the resulting data to the final target Machine Learning (Brain): The brain is the Machine Learning system used to make predictions about data. The system is trained using the data resulting of the ETL process. Once it has been trained, it is deployed into each classbot Backoffice WebGUI (for example THIAPP): It provides some feedback to the brain in order to take into account the analyst input and entire monitoring of the process of data gathering Classbots: Are responsible of classifying incoming URLs in a distributed manner using the predictions performed by the Artificial Intelligent system and a set of predefined filters. The deployer is used to distribute the algorithm (setup with the correct parameters) among different classifying bots (classbots)

Backoffice Web GUI (THIAPP): Process Monitoring:

It is a web interface to control the performance and management of the whole infrastructure, including data visualization & comparison about Botnets and information sources, and building the training dataset for different machine learning algorithms.

In order to do that that, it is able to:
Query and act as a client for the Mass Storage API in order to retrieve any kind of information linked to malicious URLs that have been processed by whole system
Query and act as a client for the Mass Storage API in order to let the analyst report false positives to the different machine learning engines: URL Classification and Data Processing (normalization and extraction of credential patterns). This false positive reported by the analysts will be used to re-train the algorithm and redistribute it to the classification layer
Query and act as a client for the Information Extraction & Monitoring API in order to:
Setup the engine, providing all necessary parameters for the auto-scaling algorithm
Provide information needed by the sinkholing controller
Query the status and performance of the different layer components These GUI data presentation interface applications are attached to the DJANGO framework, so that the developments can be managed through a single development point by means of separate and individual applications, and for an embodiment include at least the following ones:
Dashboard: Main services status dashboard
Malware/URL Types classification monitoring: Malware types and C&C URLs classification monitoring
Sandbox Performance Monitoring: Monitoring of all malware sandbox performance and analysis throughput
Information Gathering Crawlers (Botnet/Malware related): Monitoring of information gathering crawlers—Botnet URLs and Binaries
Intelligence campaigns Monitoring (Virustotal Source): Virustotal campaign monitoring per day
Intelligence campaigns Monitoring (Sources Overview—Third Party Technical Alliances): Campaign monitoring per day—Overview of different amount of sources: Alliances, Open, etc.

Figure 7:
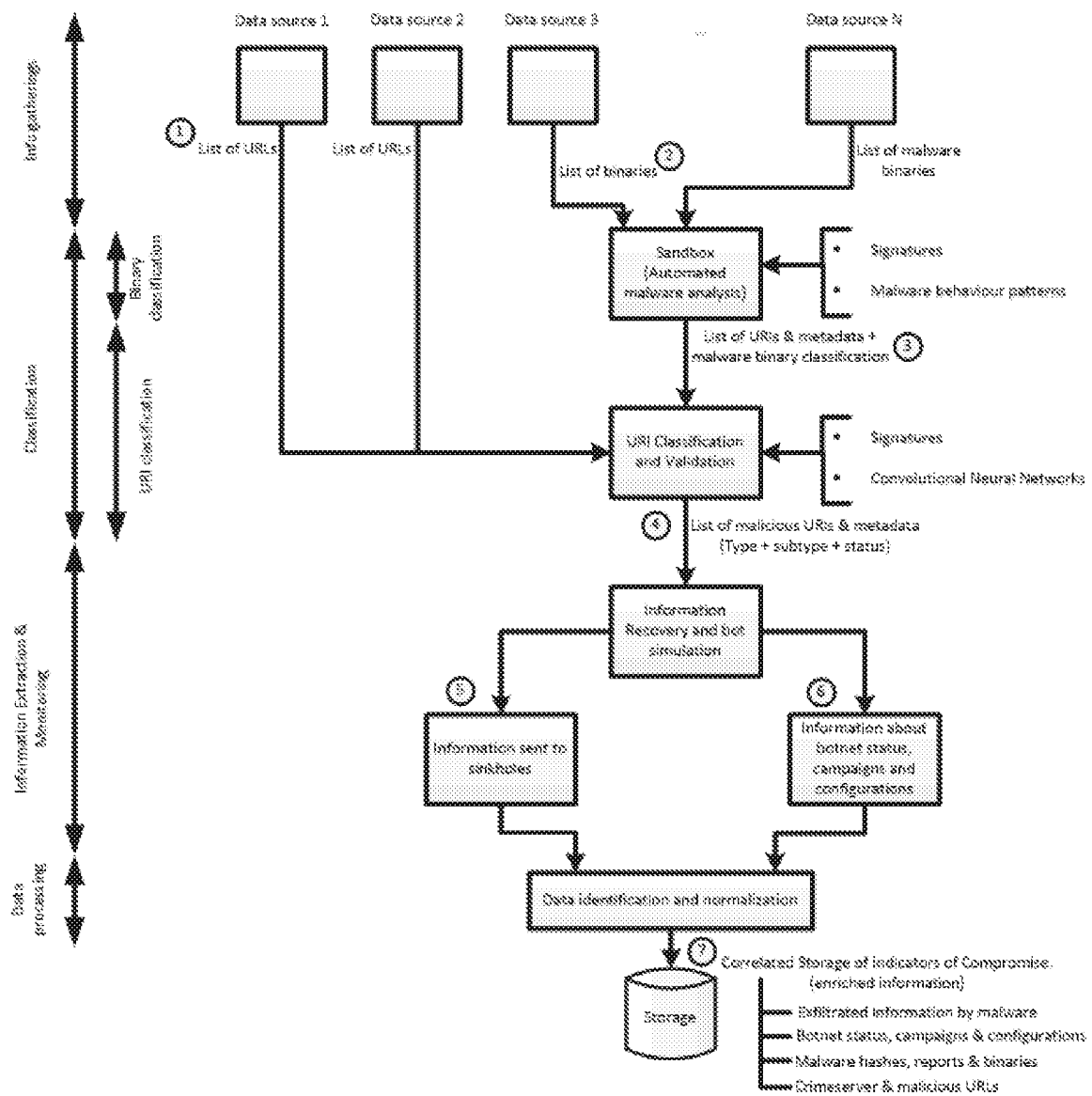
FIG. 7 schematically shows a summary of the process that is used to uncover information & track botnet activity according to an embodiment of the method of the first aspect of the present invention.

Data Flow and Examples:

FIG. 7 shows a summary of the process that is used to uncover information & track botnet activity, according to an embodiment of the method of the first aspect of the invention, and is described below At situation 1 indicated at FIG. 7, an example of the information the system is dealing with, is a list of unclassified and unknown URLs which could be benign or even malicious:
http://falatrade.com/images/lbtluser01/admin.php
http://humsabkinz.info/deliverghome.com/update/Panefive/PvqDq929BSx_A_D_M1n_a.php
http://6.10.76.98.in-addr.arpa/
http://shokolad-nn.ru/index.php-q-pakistani-young-village-girl-nude/_h8nqgrtiai8ie9cbaefy5e0
. . .

On the other hand, situation 2 will provide huge variety of binaries which, at that point, might be malicious, benign or even potentially unwanted applications such as Adware, Clickers (which will need to be discarded). Some examples of it are the following hashes equivalent to an ID of a unique binary:
SHA-1: 5b4903438343a78dd725e7ce964cd287957ee8d7
SHA-1: 94b9a91a662cfb6a5fc8d33410c29ff4543d3ce2
SHA-256: 9477160d0dfb44a9abbd5ce68a69b2aaf9ca7c0a7c232c93609c59b62589742e
SHA-256: 5fe89563da71902f54e80f74ad7be768be2562d872bde5d02911b90da84028f6
. . .

Once the binary it has been run into the elastic sandbox (situation 3), and report it has been generated containing information about static binary analysis (headers, loaded libraries,), dynamic analysis (network traffic, executed processes, actions performed by the processes directly to filesystem, registry keys, etc.) and metadata (binary classification, encryption keys, Domain Generation Algorithms, C&C/Exfiltration servers, botnet IDs, botnet campaign IDs, malware seeds, etc.) are obtained by using signatures or behaviour patterns to recognize malware actions at static or runtime. This means that the sandbox needs to be patched against anti-sandbox techniques that will prevent a malicious samples to be executed correctly into a certain environment.

As an example of the output generated, see the following extract:
Snipped of the report for SHA-256: 5fe89563da71902f54e80f74ad7be768be2562d872bde5d02911b90da84028f6
Malware Type: ATMOS
URLs:
http://192.168.1.97/atmos/file.php
http://192.168.1.97/atmos/file.php|file=config.xml
http://crl.microsoft.com/pki/crl/products/CodeSignPCA2.crl
http://crl.microsoft.com/pki/crV/products/CodeSignPCA.crl
Botnet ID name: botnet
Botnet ID Value: main
Login key: 35333344393232364534433143453041393831354442454231393233335414534
XOR Key: 3e4abb01841bb298122bb5efb1bed171
Base Key: 6bb32dd11b2b1f7c016982277e433d01114497422640f085bdafa87b8de6aa
22c7111c37a8183da7fa347193eeb7fe01eb4b8894d6a9cc0aacbd3200f0077a
828e4a14c7a49bca8642ddcee5a90a6d1c6c81672a2a85e491c8e6b4757b73f fd519ea399ae2da254c9f88b21d30de58ece55ca9f96335e9535dafc188bf03ea
649083efca23797373d41214a907a0c7db689f967ea530004bd25d8ae93c9c75fa736f69832f02a3df45af5db621860e7f1 a6ad6f990df036983c2ba7fe5fdcd4cf9cbf341c35ea5ef939a64114edceb7a8a1a6160785f0e4e8e02b6486ea432b2c
cfb0dd70e1c0888860f5c1be9407c6bfe0d385022d95ece30c89ce8d47
Salt: 0xf2c9cdef
Snipped of the Report for SHA-1: 94b9a91a662cfb6a5fc8d33410c29ff4543d3ce2

Malware Type: PONY
Encryption Password: cryptimplus
Identified URLs:
   http://6.dryaddesigns.com/ponyb/gate.php
   http://inpieces.hu/0pCQP1.exe
   http://www.sieg-vergaser.de/9wBu.exe
   http://168.144.214.176/4Cm.exe
   http://br1.irontrial.com:8080/ponyb/gate.php
   http://6.magicalomaha.com/ponyb/gate.php
   http://6.creepyassstuff.com/ponyb/gate.php

| URL | Origin | Type | Subtype |
|---|---|---|---|
| http://6.dryaddesigns.com/ponyb/gate.php | 94b9a91a662cfb6a5fc8d33410c29ff4543d3ce2 | C&C | PONY |
| http://inpieces.hu/0pCQP1.exe | 94b9a91a662cfb6a5fc8d33410c29ff4543d3ce2 | MALWARE | BINARY |
| http://www.sieg-vergaser.de/9wBu.exe | 94b9a91a662cfb6a5fc8d33410c29ff4543d3ce2 | MALWARE | BINARY |
| http://168.144.214.176/4Cm.exe | 94b9a91a662cfb6a5fc8d33410c29ff4543d3ce2 | MALWARE | BINARY |
| http://br1.irontrial.com:8080/ponyb/gate.php | 94b9a91a662cfb6a5fc8d33410c29ff4543d3ce2 | C&C | PONY |
| http://6.magicalomaha.com/ponyb/gate.php | 94b9a91a662cfb6a5fc8d33410c29ff4543d3ce2 | C&C | PONY |
| http://6.creepyassstuff.com/ponyb/gate.php | 94b9a91a662cfb6a5fc8d33410c29ff4543d3ce2 | C&C | PONY |
| http://cri.microsoft.com/pki/crl/products/ | 5fe89563da71902f54e80f74ad7be768be2562d872bde5d02911b90da84028f6 | BENING | N/A |
| http://192.168.1.97/atmos/file.php | 5fe89563da71902f54e80f74ad7be768be2562d872bde5d02911b90da84028f6 | C&C | ATMOS |
| https://188.255.169.176/ | c913309d91c59d6cb705fdbfc2bd9abaef0c4ddfc586145088fd823b418c27c9 | C&C | DYRE |
| https://75.137.112.81/ | c913309d91c59d6cb705fdbfc2bd9abaef0c4ddfc586145088fd823b418c27c9 | C&C | DYRE |
| https://69.163.81.211/ | c913309d91c59d6cb705fdbfc2bd9abaef0c4ddfc586145088fd823b418c27c9 | C&C | DYRE |
| https://216.254.231.11/ | c913309d91c59d6cb705fdbfc2bd9abaef0c4ddfc586145088fd823b418c27c9 | C&C | DYRE |
| http://www.download.windowsupdate.com/msdownload/update/v3/static/trustedr/en/authrootstl.cab | c913309d91c59d6cb705fdbfc2bd9abaef0c4ddfc586145088fd823b418c27c9 | BENING | N/A |
| http://icanhazip.com | c913309d91c59d6cb705fdbfc2bd9abaef0c4ddfc586145088fd823b418c27c9 | BENING | N/A |

Snipped of the Report for SHA-256:
c913309d91c59d6cb705fdbfc2bd9abaef0c4ddfc586145088fd823b418c27c9
   Malware Type: DYRE
   Identified URLs:
      https://188.255.169.176/
      https://75.137.112.81/
      https://69.163.81.211/
      https://216.254.231.11/
      http://www.download.windowsupdate.com/msdownload/update/v3/static/truste dr/en/authrootstl.cab
      http://icanhazip.com/

As it can be seen, from the output of the report we can have the binary or the malware sample classified, but many times, the binary generated different URLs and the system needs to verify and classify all of them in order to:
   Double check for false positives
   Discard benign URLs that by any reason a malware might embed into the binaries (many times in order to fool security researchers and malware reverse engineers)
   Identify malicious URLs. Many times a malware simply acts as a Loader, meaning that they are a RAT, but the criminal organization owning the botnet distributes more malware using such an infected botnet.

According to the reasons mentioned above, the system has the URL classification, which allows performing such double checking, and differentiate real malicious URLs among all the total amount of URIs. This means, that as an output of this engine (Situation 4), it will be obtained the following sample of results:

All this output will be provided to the information recovery engine, which will decide what to do with every URL and type/subtype of URL:

Sinkholed Data (Situation 5)

Here the system receives an amount of requests at the sinkholes the present Applicant own. Many times using HTTP protocol using encrypted and binary payloads that the engine needs to identify and process with the information provided by URL classification engine.

Bot Simulation (Situation 6)

Here the system emulates the behaviour of an infected bot in order to query the botnet C&Cs in order to get updates about the status of the botnet and new orders being given from the main controllers. This bot simulation can be done for each URL with the information provided by URL classification engine.

Figure 8:
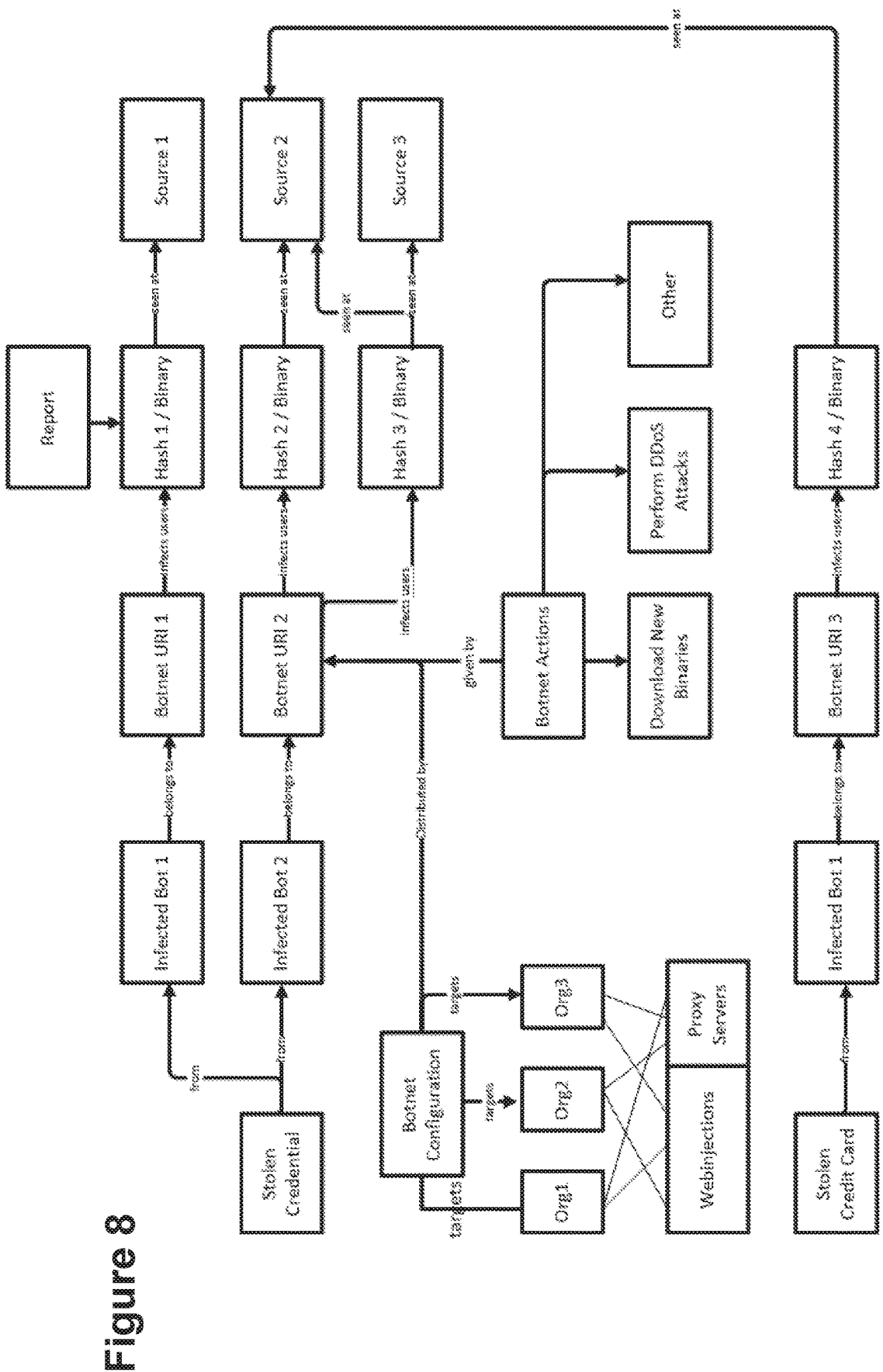
FIG. 8 graphically shows relationships established at situation 7 in FIG. 7, by a big data engine into which information processed and normalized, at situations 5 and 6 in FIG. 7, is stored, for a particular embodiment of the present invention.

Once this information is processed and normalized it is stored in a big data engine being able to stablish the relationships (Situation 7) depicted in FIG. 8, where it can be seen relationships within stolen credentials/credit cards of the users owning them, with the infected machines (Bots), with the exfiltration servers (C&C) where the information is sent by the malware, with the malware hashes that have been used to infect the users. Being able to perform a full forensic analysis (reconstruct the kill chain or attack steps) from the source or distribution to the end-user which is finally affected by the personal information theft. In addition, FIG. 8 also describes the botnet configuration monitoring. Fact that allows the system to early detect new malware campaigns against certain Organizations, such as Financial Institutions, or Countries.

A person skilled in the art could introduce changes and modifications in the embodiments described without departing from the scope of the invention as it is defined in the attached claims.

The invention claimed is:

1. A computer-implemented method for identifying malicious Uniform Resource Identifier (URI) data items, comprising performing by one or more computing entities the following steps:
   a) automatically gathering URI data items;
   b) automatically analyzing said URI data items to at least classify the URI data items into malicious URI data items and non-malicious URI data items, said step b) comprising the following sub-steps:
      b1) testing a plurality of candidate malicious binary files of said URI data items in a monitored sandboxing environment of a computing entity connected to a communications network, and, based on a behavior of the candidate malicious binary files when being tested, classifying them into non-malicious binary files and different types of malicious binary files;
      b2) monitoring a network activity associated to said computing entity when said candidate malicious binary files are being tested therein, to identify connections of the computing entity with one or more malicious servers, and obtain the URIs associated to said identified connections; and
      b3) analyzing said URIs obtained at sub-step b2) and further URIs obtained directly from step a), to classify them at least into malicious and non-malicious URIs;
   a step c) including:
   c1) intercepting communications with malicious servers, identified by said malicious URIs, from several computing entities, by using sinkholing techniques, and uncovering and retrieving, through said intercepted communications, information which is being exfiltrated to said malicious or supervised servers; and
   c2) monitoring, every certain period of time, a status of said malicious servers identified by the malicious URIs, to control if the malicious servers have been taken down or not, and simulating an infected bot to get updates of the commands sent from said malicious servers to its network of bots, and vice versa;
   d) processing said uncovered information with learning algorithms to normalize and interpret data contained therein, to identify sensitive data that has been stolen and information about where such data come from and associated information, to at least provide warnings about potential cyber threats or disconnect network communications of at least one computer;
   e) delivering to a mass storage device said normalized and interpreted data and also reports made at sub-step b1) containing information about said classification of the malicious binary files, and
   f) providing said warnings about potential cyber threats and information included in said reports to a user, through a web interface;
   wherein said normalized and interpreted data is related to user's personal data, including at least one of passwords, logins, PIN codes, credit cards or banking credentials, and bots Internet Protocols (IPs), correlated with associated URIs and said reports made at step b1) and associated malicious binary files, the method comprising performing computer forensics from a source of distribution to the user which is finally affected by the personal data theft to identify and reconstruct a kill chain or attack steps relating a to the personal data with an associated malicious binary file, through corresponding bot Internet Protocol (IP), associated URI and reports.

2. A method according to claim 1, wherein said sub-step b2) also comprises obtaining additional information, including metadata, associated to at least the obtained URIs, and process said additional information at sub-step b3).

3. A method according to claim 2, comprising performing at least said sub-step c1) by using said additional information, processed or unprocessed at sub-step b3), when associated to said malicious URIs, to perform said communications interception and information uncovering and retrieving.

4. A method according to claim 3, comprising performing said sub-step c1) by means of receiving requests including at least the following information: URI, type of servers and said additional information; and in response to said requests and using the contents thereof performing said communications interception by managing Domain Name System (DNS) pointers and Internet Protocol (IP) traffic mirroring, and wherein the sub-step c1) further comprises, in response to said requests, selecting and running a most appropriate algorithm for each URI, based at least on the type of server associated thereto, out of a plurality of available algorithms, said running causing said uncovering and retrieving of exfiltrated information.

5. A method according to claim 3, wherein said additional information includes at least one of the following types of information: encryption keys, configuration parameters, types of servers, HyperText Markup Language (HTML) content, and JavaScript code.

6. A method according to claim 2, wherein said additional information includes at least one of the following types of information: encryption keys, configuration parameters, types of servers, HyperText Markup Language (HTML) content, and JavaScript code.

7. A method according to claim 1, comprising performing said sub-step b3) to automatically extract features from URIs, HyperText Markup Language (HTML) and JavaScript content.

8. A method according to claim 7, comprising using a combination of signature based algorithm and machine learning techniques implemented by means of at least one or more convolutional neural networks to perform said sub-step b3), and implementing said machine learning techniques by means of a trained network which combines several of said convolutional neural networks, each trained with data from a different source, wherein each of said convolutional neural networks includes one logical layer on top of word vectors obtained using an unsupervised neural language model, and one logical output layer which outputs a probability that each analyzed URI belongs to a malicious URI.

9. A system for identifying malicious Uniform Resource Locator (URI) data items, the system comprising one or more computing entities adapted to perform the steps of the method according to claim 1, said one or more computing entities including at least the following layers and modules operatively connected to each other:
- a raw information gathering layer adapted to perform step a);
- a classification layer adapted to perform step b);
- an information and extraction layer operatively connected to said classification layer to receive said malicious URIs and associated additional information provided by the classification layer, wherein said information and extraction layer is adapted to perform steps c1) and c2) and to provide the uncovered information to a data processing module connected thereto;
- said data processing module operatively connected to said information and extraction layer to receive the uncovered information and adapted to perform step d) and the action of providing the normalized and interpreted data and also reports of step e) to a mass storage device connected thereto;
- a mass storage module adapted to implement said mass storage device in step e); and
- a web interface module operatively connected to the classification layer, the information and extraction layer, the data processing module, and the mass storage module, wherein said web interface module is adapted to perform step f) and also the control of the operation and management of the layers and modules connected thereto.

10. A non-transitory computer readable medium including code instructions that when executed in a computer implement a method according to claim 1.

* * * * *